Dec. 1, 1959   J. B. TALLON ET AL   2,915,264
MOTOR SUPPORT
Filed June 10, 1957

JAMES BRADLEY TALLON
HASTING MELDRIN CRAPSE
INVENTORS

BY Paul S. Seward
ATTORNEY of an automotive frame. From opposite sides of the same half of the bracket are depending lugs, the anterior lug being shown as 3 and the posterior lug being shown in Figs. 1, 2 and 3 as 4 and in Fig. 6 as 4A, the difference being that in Fig. 6 the posterior lug 4A depends only from the half of the base 1 provided with hole 2, while in Figs. 1, 2 and 3 the posterior lug 4 depends from the full length of the base 1. The base 1 and the lugs 3 and
United States Patent Office 2,915,264
Patented Dec. 1, 1959

2,915,264
MOTOR SUPPORT

James Bradley Tallon, Lamar, and Hasting Meldrin Crapse, Florence, S.C.

Application June 10, 1957, Serial No. 664,587

4 Claims. (Cl. 248—9)

This invention relates to an improved device for fastening an automobile engine to the frame, and more particularly to a bracket fastening the clutch housing, which constitutes the rear of the engine unit in G.M.C. and Chevrolet trucks sized from ½ through 2 tons in the 1938 through 1953 models, to the cross member of the frame.

It will be appreciated that not only are there a great quantity of these trucks in use, but that once this invention is known, it is quite possible that other or future models may require it.

The extremely rough usage to which these trucks are put puts extreme strain on the fastening of the clutch housing to the frame. A series of different devices have been used, each with defects in operation, in ease of installation, or in cost, or in a combination of these. The present G.M. part No. 3711027 is a kit of right and left corner attachments comprising 7 parts each and requiring a considerable number of hours to install.

An object of this invention is to better and more simply attach the corners of a clutch housing or the like to the frame and to materially reduce the installation time.

Other objects of the invention will in part be obvious and will in part appear hereinafter.

Figure 1:
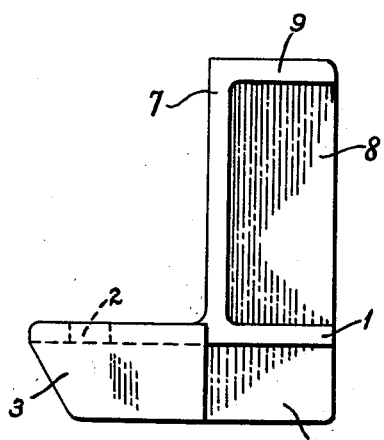
Fig. 1 is a "front" elevation of a right-hand bracket ("front" meaning from the front of the engine if it were in place).
Figure 2:
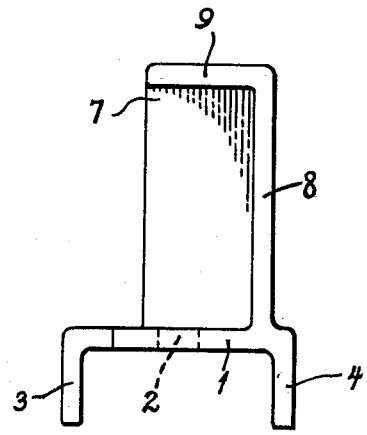
Fig. 2 is an end elevation of the same (as if looking from the center of the axis of the car outward).
Figure 3:
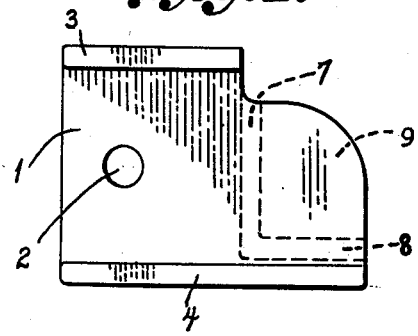
Fig. 3 is a bottom view of the same.
Figures 4, 5:
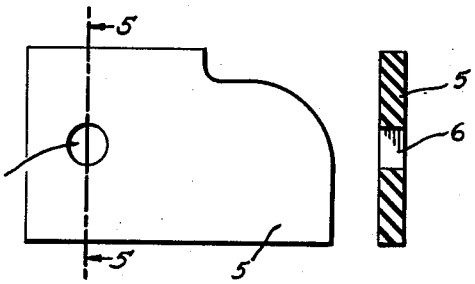
Fig. 4 is a bottom view of a pad which we use in conjunction with the bracket.
Fig. 5 is a section taken along the line 5—5 of Fig. 4 looking in the direction of the arrows.
Figure 6:
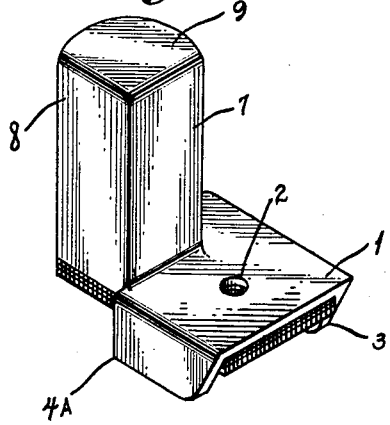
Fig. 6 is a perspective view of a slightly modified form of bracket with the pad in place.

In the forms shown in the drawings the device has only two parts, a unitary bracket and a pad. The bracket is formed with a flat base section 1 having near the middle of one half a hole 2 of a sufficient size to accommodate a bolt for attachment of the device to a cross-member of an automotive frame. From opposite sides of the same half of the bracket are depending lugs, the anterior lug being shown as 3 and the posterior lug being shown in Figs. 1, 2 and 3 as 4 and in Fig. 6 as 4A, the difference being that in Fig. 6 the posterior lug 4A depends only from the half of the base 1 provided with hole 2, while in Figs. 1, 2 and 3 the posterior lug 4 depends from the full length of the base 1. The base 1 and the lugs 3 and 4 or 3 and 4A are so measured as to intimately enwrap pad 5 and the upper part of a cross member of an automobile frame. Pad 5 is formed of a strong yet resilient material such as rubber, which may be reinforced, and is shaped in an outline similar to base 1, with a corresponding hole 6.

From near the middle of base 1 arises lateral surface 7, adjoined on its side at a right angle by rear surface 8. Adjoining both lateral surface 7 and rear surface 8 and at right angles thereto is top surface 9. The dimensions of these surfaces are such as to intimately enclose the corresponding surfaces of the right rear corner of a clutch housing which is the rear portion of certain engine units.

It will be understood that these drawings and descriptions show and describe only a right-hand unit, but that a corresponding left-hand unit, with such reversals of dimensions as are appropriate, is made to hold the left rear corner of the engine unit to the frame. Pad 5, of course, can be simply turned over to fit a left-hand bracket.

It will be noted that our unit is not bolted to the engine unit, as has heretofore been considered essential. We have found that the intimate enwrapping of the corner of the engine unit on the top and bottom and on two sides results in an eminently satisfactory holding against the tremendous strains involved and reduces the installation time to a fraction of what earlier devices have required, since the bolt hole formerly required in the clutch housing was relatively inaccessible and frequently was filled with a sheared-off portion of a bolt. It will also be noted that the use of a pair of our devices restricts the engine unit from all movement relative to the frame except in a forward direction, the forward motion being adequately controlled by other or similar means.

We claim:

1. A motor support comprising a unitary metallic member having a base, an anterior lug depending therefrom at a right angle, a posterior lug depending therefrom and parallel to said anterior lug, a lateral projection at a right angle to said base and said lugs and on the opposite side of said base from said lugs, a rear projection joined to said base and said lateral projection and at right angles to both, and a top projection joined to said lateral projection and said rear projection and at right angles to both.

2. A motor support according to claim 1 and a resilient pad shaped to conform to said base between said lugs.

3. A motor support according to claim 1, said base having a vertical hole through a portion which is not opposite said top projection.

4. A motor support according to claim 1 wherein said posterior lug is broader than said anterior lug.

References Cited in the file of this patent

UNITED STATES PATENTS

| | | |
|---|---|---|
| 1,100,916 | Rottman | June 23, 1914 |
| 1,326,960 | Petrie | Jan. 6, 1920 |
| 1,349,418 | Flynn | Aug. 10, 1920 |
| 1,870,731 | Isaacson | Aug. 9, 1932 |

FOREIGN PATENTS

| | | |
|---|---|---|
| 710,811 | France | June 16, 1931 |